(12) United States Patent
Kuroda et al.

(10) Patent No.: US 8,890,080 B2
(45) Date of Patent: Nov. 18, 2014

(54) DETECTOR MODULE, LIGHT SHIELDING MEMBER, RADIATION DETECTING APPARATUS, AND RADIATION IMAGING APPARATUS

(71) Applicant: GE Medical Systems Global Technology Company, LLC, Waukesha, WI (US)

(72) Inventors: Yoshiyasu Kuroda, Tokyo (JP); Kotatsu Kawaguchi, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 115 days.

(21) Appl. No.: 13/772,577

(22) Filed: Feb. 21, 2013

(65) Prior Publication Data

US 2013/0221228 A1  Aug. 29, 2013

(30) Foreign Application Priority Data

Feb. 23, 2012  (JP) .................... 2012-037141

(51) Int. Cl.
*G01T 1/20* (2006.01)
*G02B 5/00* (2006.01)

(52) U.S. Cl.
CPC ............... *G01T 1/2006* (2013.01); *G02B 5/00* (2013.01); *G02B 5/003* (2013.01)
USPC ........................................... 250/366

(58) Field of Classification Search
CPC ..................................... G01T 1/1642
USPC ........................................... 250/366
See application file for complete search history.

(56) References Cited

U.S. PATENT DOCUMENTS

| 7,791,036 | B2 | 9/2010 | Yu et al. |
| 8,044,362 | B2 | 10/2011 | Goo et al. |
| 2012/0093280 | A1* | 4/2012 | Konno et al. ................ 378/7 |
| 2012/0205530 | A1 | 8/2012 | Beaulieu et al. |
| 2012/0267538 | A1 | 10/2012 | Ulasyuk et al. |
| 2013/0028381 | A1 | 1/2013 | Sung et al. |

FOREIGN PATENT DOCUMENTS

JP          05045469        2/1993

* cited by examiner

*Primary Examiner* — David Porta
*Assistant Examiner* — Hugh H Maupin
(74) *Attorney, Agent, or Firm* — Armstrong Teasdale LLP

(57) ABSTRACT

A detector module configured to be included in an array of a plurality of detector modules that form a radiation detector is provided. The detector module includes a light emitting element configured to emit fluorescence upon receiving radiation, a light receiving element configured to convert the fluorescence into an electrical signal, and at least one support member located on a side opposite from said light emitting element, said at least one support member configured to support a light shielding member which covers a gap formed between adjacent detector modules in the array.

20 Claims, 3 Drawing Sheets

DETECTOR MODULE, LIGHT SHIELDING MEMBER, RADIATION DETECTING APPARATUS, AND RADIATION IMAGING APPARATUS

CROSS REFERENCE TO RELATED APPLICATIONS

This application claims the benefit of Japanese Patent Application No. 2012-037141 filed Feb. 23, 2012, which is hereby incorporated by reference in its entirety.

BACKGROUND OF THE INVENTION

The present invention relates to a detector module and a light shielding member suitable for shielding incident light on a radiation detector, and to a radiation detecting apparatus and a radiation imaging apparatus using the same detector module and light shielding member.

The radiation tomographic imaging apparatus represented by X-ray CT (computed tomography) equipment is furnished with a radiation detector for detecting the radiation that has passed through an imaging object. Many such radiation detectors are composed of layers of a light emitting element array and a light receiving element array, the light emitting element array emitting fluorescence upon receipt of radiation, the light receiving element array outputting electrical signals when receiving the fluorescence.

Structured as outlined above, these radiation detectors are sealed with a light shielding material to prevent the intrusion of external light. That is because any incident light other than the fluorescence on the imaging detectors can result in faulty detection (e.g., see the abstract of Japanese Unexamined Patent Publication No. Hei 5(1993)-045469).

In recent years, a growing number of radiation detectors have been of the type in which a plurality of detector modules is arrayed to ensure better assembling efficiency and higher arraignment accuracy. Many of these radiation detectors have tiny gaps between their arrayed detector modules sealed with light shielding material.

Meanwhile, a recent trend is for these detector modules to integrate diverse functions so as to improve the radiation detection capability, saving space, and so on. For this reason, the detection module substrate in many cases has electronic devices and other parts laid out thereon in high concentrated manner up to the substrate edges. That is, in the radiation detector, electronic devices are in close proximity to one another between adjacent detector module substrates, so that the gaps between the devices are very narrow. As a result, it has become increasingly difficult to light shield the gaps between the detector modules easily and securely, especially those gaps formed on the opposite side of the radiation incidence plane.

In view of the above circumstances, the need exists for a technique that light shield the gaps between detector modules securely and easily.

BRIEF DESCRIPTION OF THE INVENTION

In a first aspect, a detector module, a plurality of which are arrayed to configure a radiation detector, the is provided. The detector module includes a light emitting element for emitting fluorescence upon receiving radiation, a light receiving element for converting said the fluorescence into an electrical signal, and a support member (or support portion) located on the opposite side of a radiation incidence plane for supporting a light shielding member which covers a gap between the detector modules formed when the plurality of detector modules are arrayed.

In a second aspect, a detector module according to the first aspect above is provided, wherein the support member is provided at each of both edges of the arrayed direction of the detector modules, and configured so as to support said the light shielding member with said the support members at adjacent sides of the detector modules adjacent to each other being paired with each other, when the plurality of detector modules are arrayed.

In a third aspect, a detector module according to the second aspect above is provided, wherein the paired support members are configured to support said the light shielding member by tucking at least a part thereof.

In a fourth aspect, a detector module according to the second or the third aspect above is provided, wherein the support members at said both edges are shaped symmetrically to each other relative to a center line of said the array direction of detector modules.

In a fifth aspect, a detector module according to any one of the first through the fourth aspects above is provided, further including a radiator on the opposite side of said the radiation incidence plane, wherein said the support member is provided on the radiator.

In a sixth aspect, a detector module according to the fifth aspect above is provided wherein the support member is formed integrally with the radiator.

In a seventh aspect, a detector module according to the fifth aspect above is provided, wherein the support member is formed using a part fixed to the radiator.

In an eight aspect, a detector module according to any one of the fifth through the seventh aspects above is provided, wherein the radiator is made of aluminum or an aluminum alloy.

In a ninth aspect, a light shielding member for sealing gaps between a plurality of detector modules arrayed to configure a radiation detector is provided. Each of the detector modules is supported by a support member provided on the opposite side of a radiation incidence plane.

In a tenth aspect, a light shielding member according to the ninth aspect above is provided, wherein the light shielding member seals altogether a plurality of the gaps formed in parallel by at least three detector modules being arrayed.

In an eleventh aspect, a light shielding member according to the tenth aspect above is provided, wherein the light shielding member is formed by a plurality of light shielding plates joined integrally, each of the light shielding plates corresponding to each of the gaps.

In a twelfth aspect, a light shielding member according to any one of the ninth through the eleventh aspects above is provided, wherein the width of a portion supported by the support member is irregular relative to a lengthwise direction.

In a thirteenth aspect, a light shielding member according to any one of the ninth through the twelfth aspects above is provided, wherein the light shielding member is colored black.

In a fourteenth aspect, a light shielding member according to any one of the ninth through the thirteenth aspects above is provided, wherein the light shielding member is composed of a plastic resin.

In a fifteenth aspect, a radiation detecting apparatus including a plurality of detector modules arranged to configure a radiation detector is provided. Each of said the detector modules includes a light emitting element for emitting fluorescence upon receiving radiation, a light receiving element for converting said fluorescence into an electrical signal, and a support member located on the opposite side of a radiation incidence plane for supporting a light shielding member which covers a gap between the detector modules formed when the plurality of detector modules are arrayed.

In a sixteenth aspect, a radiation imaging apparatus including a radiation detecting apparatus is provided. The radiation detecting apparatus includes a plurality of detector modules arranged to configure a radiation detector, each of said detector modules including a light emitting element for emitting fluorescence upon receiving radiation, a light receiving element for converting said fluorescence into an electrical signal, and a support member located on the opposite side of a radiation incidence plane for supporting a light shielding member which covers a gap between the detector modules formed when the plurality of detector modules are arrayed.

In a seventeenth aspect, a radiation imaging apparatus according to the sixteenth aspect above is provided, wherein the radiation imaging apparatus performs radiation imaging of an object.

According to the above-mentioned aspects, the support members possessed by the detector modules are configured to support the light shielding member for light shielding the gaps between the detector modules. This makes it possible to light shield the gaps between the detector modules securely and easily while eliminating the need for tedious and unstable work that typically involves manually sealing these gaps with light shielding tapes or the like.

DETAILED DESCRIPTION OF THE INVENTION

Exemplary embodiments are explained below. It should be noted that these embodiments do not limit the scope of the disclosure.

First Embodiment

Figure 1:
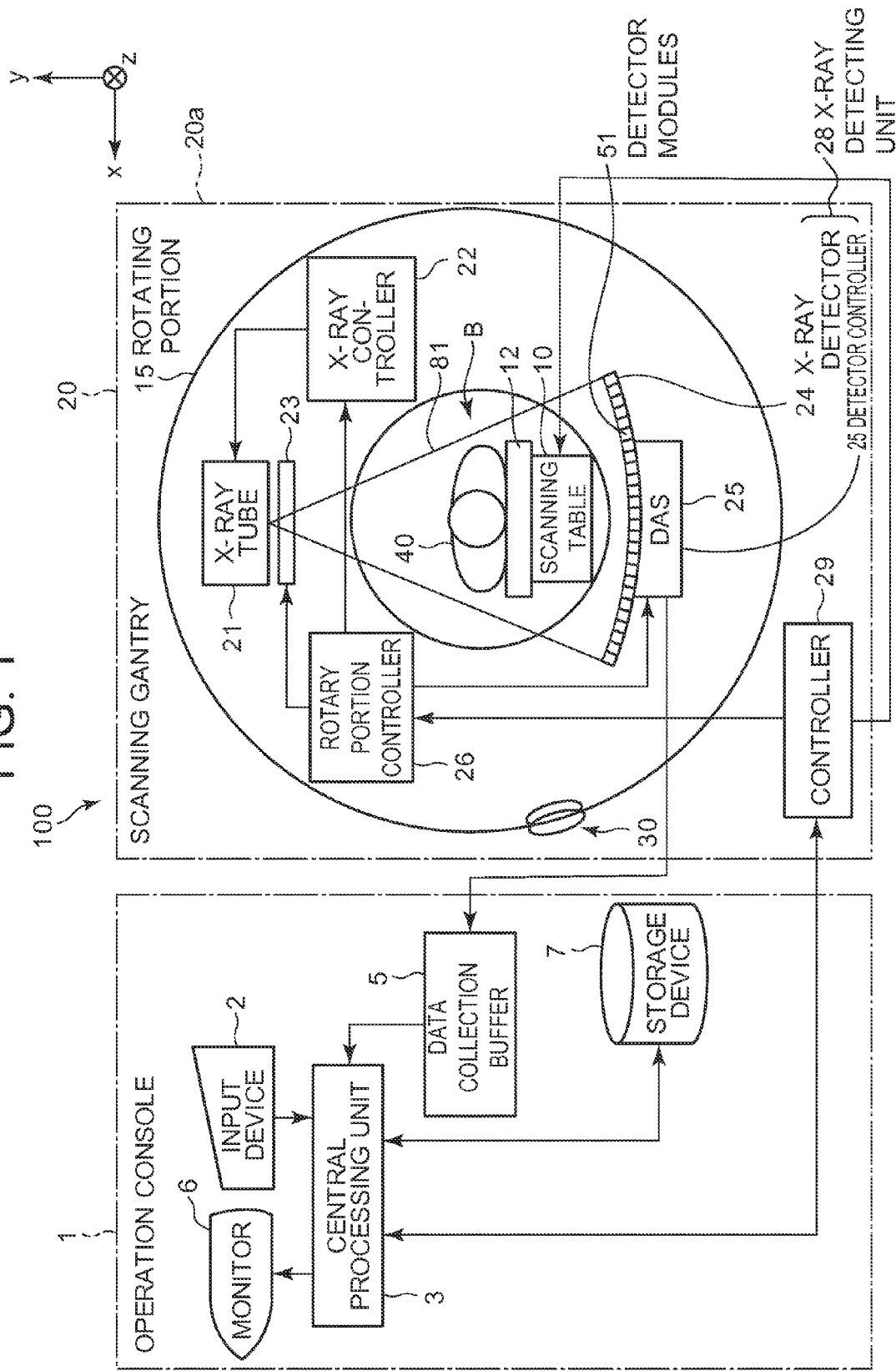
FIG. 1 is a schematic diagram outlining the structure of exemplary X-ray CT equipment.

FIG. 1 is a schematic diagram outlining the structure of exemplary X-ray CT equipment.

The X-ray CT equipment 100 includes an operation console 1, an a scanning table 10, and a scanning gantry 20.

The operation console 1 is provided with an input unit 2 that accepts input from an operator, a central processing unit 3 that controls various components for imaging a test object and processes data for generating images, a data collection buffer 5 that retains data collected by the scanning gantry 20, a monitor 6 that displays images, and a storage unit 7 that stores programs and data.

The scanning table 10 is furnished with a cradle 12 that carries a test object 40 and transports it into a hollow portion B of the scanning gantry 20. The cradle 12 is linearly moved vertically and horizontally by motors incorporated in the imaging table 10. In this example, it is assumed that the body axis direction of the test object 40, i.e., the direction in which the cradle 12 is moved in linearly horizontal fashion, is called the z-direction, that the vertical direction is called the y-direction, and that the horizontal direction perpendicular to the z-direction and y-direction is called the x-direction.

The scanning gantry 20 has a rotary portion 15, and a main body portion 20a that rotatably supports the rotary portion 15. The rotary portion 15 is provided with an X-ray tube 21, an X-ray controller 22 that controls the X-ray tube 21, an aperture 23 that rectifies X-rays 81 generated by the X-ray tube 21 into a fan beam or a cone beam, an X-ray detecting unit 28 that detects X-rays 81 having passed through the test object 40, an X-ray controller 22, and a rotary portion controller 26 that controls the aperture 23. The main body portion 20a is equipped with a control controller 29 that communicates control signals or the like with the operation console 1 and imaging table 10. The rotary portion 15 and main body portion 20a are electrically coupled via a slip ring 30.

The X-ray tube 21 and X-ray detecting unit 28 are positioned opposite to each other across an imaging space in which the test object 40 is placed, i.e., across the hollow portion B of the scanning gantry 20. As the rotary portion 15 rotates, the X-ray tube 21 and X-ray detecting unit 28 rotate around the test body 40 while maintaining their positional relationship to each other. The X-rays 81 in the form of a fan beam or a cone beam emitted by the X-ray tube 21 and rectified by the aperture 23 pass through the test object 40 to reach a detector plane of the X-ray detecting unit 28.

In this example, it is also assumed that the direction in which the X-rays 81 as the fan beam or cone beam expand on the x-y plane is called the channel direction (CH direction), that the direction in which X-rays 81 expand in the z-direction (or the z-direction itself) is called the slice direction (SL direction), and that the direction of movement toward the rotating center of the rotary portion 15 on the x-y plane is called the iso-center direction (I direction).

The X-ray detecting unit 28 is made up of an X-ray detector 24 and a detector controller 25. The X-ray detector 24 detects the X-rays having passed through the test object 40, generates X-ray projection data based on the detected X-rays, and outputs the generated data to the data collection buffer 5 via the detector controller 25.

The X-ray detector 24 is made up of a plurality of detector modules 51 arrayed in the channel direction. Although the X-ray detector of actual X-ray CT equipment may typically include 50 to 60 X-ray detector modules, FIG. 1 shows fewer detector modules for clarity.

Figure 2A:
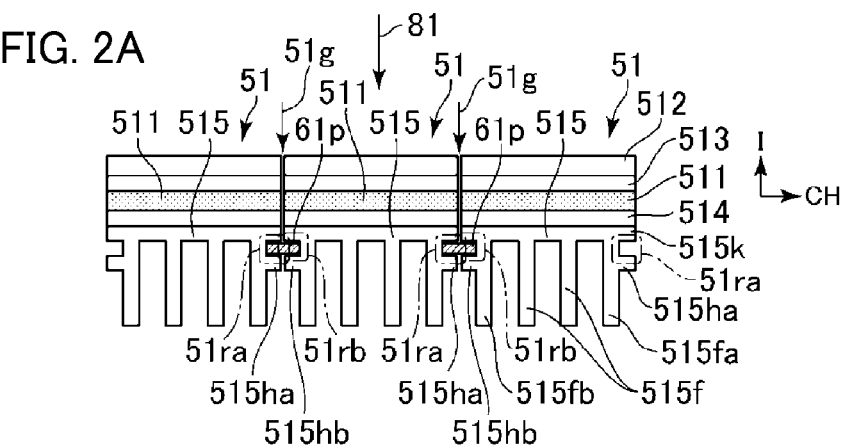
FIGS. 2A, 2B and 2C are schematic diagrams outlining the structures of a detector module and a light shielding member in a first embodiment.
Figure 2B:
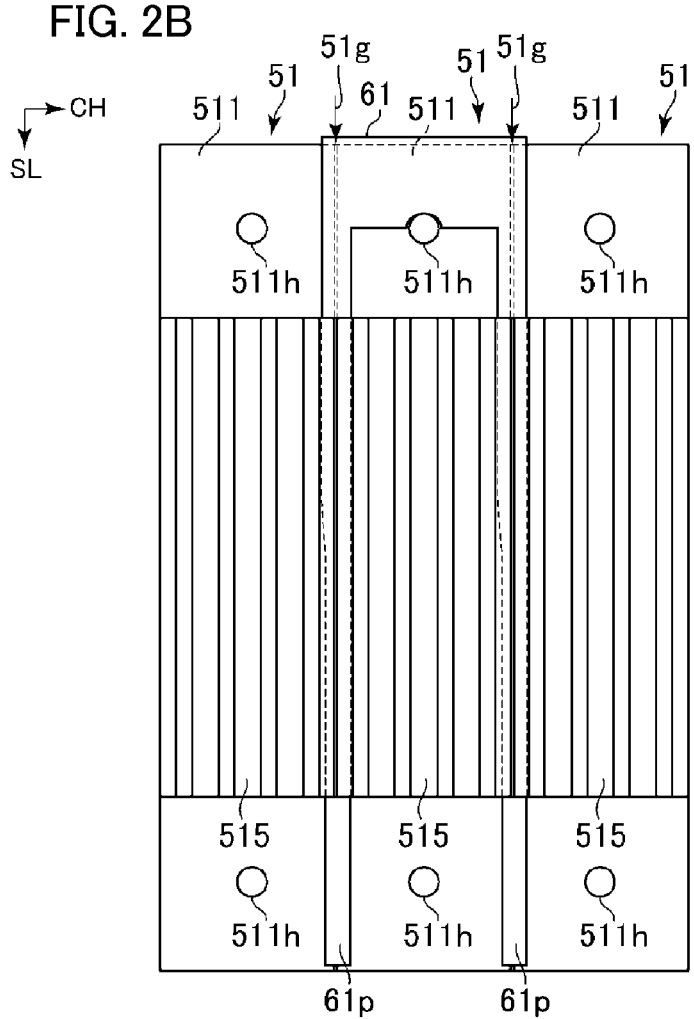
Figure 2C:
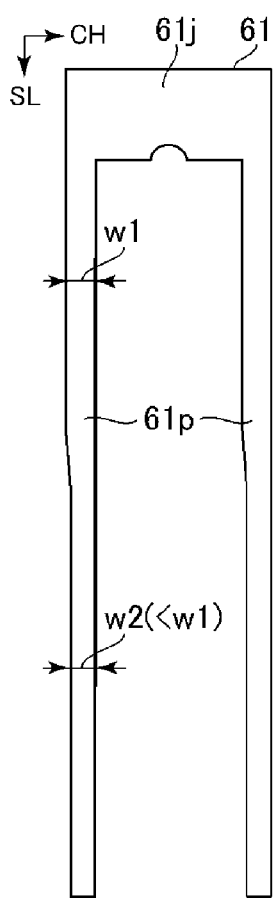

FIGS. 2A and 2B are diagrams for explaining the structures of the detector module and light shielding member in the first embodiment. FIG. 2A is a partially enlarged cross-sectional diagram of the X-ray detector 24 of the first embodiment as viewed in the slice (SL) direction. FIG. 2B is a partially enlarged cross-sectional diagram of the X-ray detector 24 as viewed in the iso-center (I) direction. FIG. 2C is a diagram showing the light shielding member 61 as viewed in the iso-center (I) direction.

As shown in FIGS. 2A through 2C, the X-ray detector 24 is furnished with a plurality of detector modules 51 attached to a frame, not shown, made of two arcing parallel rails to form an arc-like module array, and a plurality of light shielding members 61 for covering the gaps between the detector modules 51 against the intrusion of external incident light. The structures of the detector module 51 and light shielding member 61 are explained successively hereunder.

The structure of the detector module 51 is explained first.

The detector module 51 has a substrate 511, a scintillator element array 512, a photodiode element array 513, an electronic device 514, and a radiator 515.

The substrate 511 may be a rectangular ceramic board, for example. The substrate 511 is long in the slice direction. Near both ends of the slice direction are holes 511h with which to attach each detector module 51 to the frame.

The scintillator element array 512 and photodiode element array 513 are layered one on top of the other on the X-ray incidence plane of the substrate 511. The scintillator element array 512 is formed by scintillator elements arrayed in matrix. Each scintillator element (light emitting element) emits fluorescence upon receipt of the X-rays having passed through the test object 40. The photodiode element array 513 is formed by photodiode elements (light receiving elements) arranged in matrix. Each photodiode element receives the fluorescence from the positionally corresponding scintillator element and converts the received fluorescence into an electrical signal.

The electronic device 514 and radiator 515 are positioned on an X-ray exit plane opposite to the X-ray incidence plane of the substrate 511. The electronic device 514 includes a signal processing circuit and a linear power source. The signal processing circuit includes an analog front-end IC and an AD (analog-digital) converter IC whereby analog detection signals output from the photodiode element array 513 are converted to digital signals for output to the detector controller 25. The detector controller 25 forwards the received data to the data collection buffer 5. The signal processing circuit may be composed of an ASIC (application-specific integrated circuit), for example. The linear power source supplies power to the signal processing circuit. The output voltage of the linear power source is set to a constant voltage of, say for example, 2.5 V. The linear power source may be composed of a linear power source IC (integrated circuit), for example. Because it generates little electrical noise, the linear power source is suited to be positioned close to the signal processing circuit that is vulnerable to electrical noise.

The electronic device 514 consumes relatively large amounts of power thereby generating heat. To dissipate the heat, the radiator 515 is mounted on the surface of each of these devices.

As shown in FIG. 2A for example, the radiator 515 has a plurality of fins 515f, 515fa and 515th mounted upright on a plate-like base portion 515k. The fins 515f, 515fa and 515th are oriented in the iso-center (I) direction and extend in the slice direction. The fin 515fa at one edge in the channel (CH) direction has a protrusion 515ha extending from the center of the channel direction toward the outer side of this edge and approximately in parallel with the plate face of the base portion 515k. Likewise, the fin 515fb at the other edge in the channel (CH) direction has a protrusion 515hb extending from the center of the channel direction toward the outer side of this edge and approximately parallel to the plate face of the base portion 515k. In this example, the base portion 515k; the fins 515f, 515fa and 515fb; and protrusions 515ha and 515hb are integrally formed so as to reinforce their rigidity.

The base portion 515k and the fin 515fa and protrusion 515ha on one edge make up a groove-like first support portion 51ra supporting the light shielding member 61. Likewise, the base portion 515k and the fin 515fb and protrusion 515hb on the other edge form a groove-like second support portion 51rb supporting the light shielding member 61. The first and the second support portions 51ra and 51rb are configured so that when a plurality of detector modules 51 are arrayed, the first support portion 51ra of one of two adjacent detector modules 51 is paired with the second support portion 51rb of the other adjacent detector module 51 in a manner supporting the light shielding member 61 covering the gap 51g between these detector modules 51. In this example, the first and the second support portions 51ra and 51rb are shaped and arranged to tuck light shielding plates 61p of the light shielding member 61 (to be explained later) in the channel (CH) direction for support purposes.

The radiator 515 is composed of a material that is lightweight, has good thermal conductivity, and is easy to fabricate, such as aluminum or an aluminum alloy.

The first and the second support portions 51ra and 51rb are symmetrically shaped relative to the center line of the detector module 51 in the channel (CH) direction. Thus shaped, the first and the second support portions 51ra and 51rb are easy to fabricate at low cost.

Also, the radiator 515 may be colored black or the like so that its surface will absorb light and not reflect excess light.

Generally, the base portion, fins, and protrusions may be formed integrally in order to reinforce their rigidity. Alternatively, some of these components may be provided as external parts. For example, the protrusions alone may be provided as external parts that are bonded, soldered, or screwed to the fins.

The structure of the light shielding member 61 is explained next.

The light shielding member is shaped to cover the gaps between the detector modules on the X-ray exit side.

In this example, as shown in FIGS. 2A through 2C, the light shielding member 61 is formed by two light shielding plates 61p extending in the slice (SL) direction along the gaps 51b between the detector modules 51, and by a joining portion 61j that joins the light shielding plates. That is, one light shielding member 61 covers altogether two gaps 51b formed in parallel by three contiguously positioned detector modules. The light shielding member 61 is mounted when inserted into the grooves of the first and the second support portions 51ra and 51rb in the slice direction. This structure allows the work of covering a plurality of gaps 51g to be completed in one go, whereby the work efficiency in mounting the light shielding member 61 is improved.

The gap 51g is approximately tens of microns (µm) wide for example. The light shielding member 61 is approximately 1 mm to 2 mm thick in the iso-center (I) direction for example, slightly narrower than the width of the grooves of the first and the second support portions 51ra and 51rb. The light shielding plate 61p is approximately several millimeters (mm) wide in the channel (CH) direction for example, sufficiently wide to cover the gap 51g. The gap between the light shielding plates 61p is approximately 15 mm wide for example, about the same as the gap between the detector modules 51.

Also in this example, the width of the light shielding plate 61p in the channel (CH) direction is not uniform; the root of the light shielding plate 61p has a relatively larger width w1 and the tip thereof has a relatively smaller width w2 (<w1). Thus shaped, the light shielding plates 61p are not only smoothly inserted into the support portions 51ra and 51rb but also are kept from making strong, bruising contact with a flexible substrate or the like (not shown) coupled to the detector modules 61 and positioned near the gaps 51g.

The light shielding plates 61p and joining portion 61j are may be fabricated integrally to maintain their accuracy in dimensions and shapes.

Also, the number of light shielding plates 61p to be joined may be limited to two or three for example, for the following reasons: If there are more light shielding plates 61p, there will be more gaps 51g that can be light shielded thereby altogether. However, too many light shielding plates 61p can make the light shielding member 61 too large in size to handle with ease. Where the detector modules 51 are arrayed in arcing fashion, numerous light shielding plates 61p would make it necessary to bend the joining portion 61j to conform to the curvature of the array, thus pushing up the cost of fabrication.

Furthermore, the light shielding member 61 may be composed of a plastic resin or the like that is both rigid and elastic in a good balance, so that when attached or detached to or from the support portions 51ra and 51rb, the light shielding member 61 will develop a suitable contact resistance against the support portions.

As with the radiator 51b, the light shielding member 61 is may be colored black or the like so that its surface will absorb light and not reflect excess light.

In the above-described embodiment, the gaps 51g between the detector modules 51 are light shielded by attaching the light shielding member 61 to the support portions 51ra and 51rb possessed by the detector modules 51. This makes it possible to light shield the gaps 51g between the detector modules 51 securely and easily while eliminating the need for tedious and unstable work that typically involves manually sealing these gaps with light shielding tapes or the like.

Where detector modules 51 are to be replaced in an already-assembled X-ray detecting unit 28, work needs to be performed ordinarily to detach the mounted light shielding material temporarily, replace the detector modules 51 in question, and again attach the dismounted light shielding material. According to this embodiment, by contrast, the light shielding member 61 need only be inserted and extracted to and from the support portions 51ra and 51rb for removal and remounting, which boosts work efficiency. In particular, if detector modules 51 are to be replaced typically for maintenance service on X-ray CT equipment installed in the field, the work involved is subject to considerable space constraints unlike in the process of fabricating the X-ray CT equipment. The surroundings of the X-ray detecting unit 24 are very narrow and would present enormous difficulty if light shielding tapes were pasted or peeled off Under these constraints, it is much easier to insert and extract the light shielding member 61.

Second Embodiment

Figure 3A:
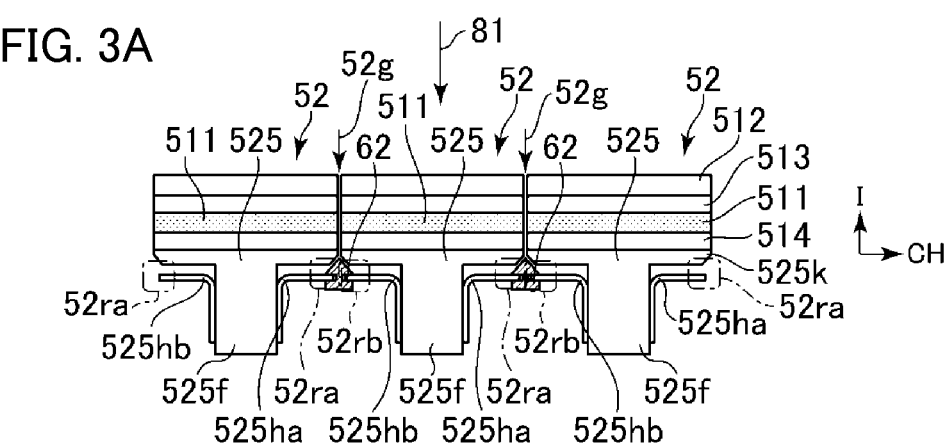
FIGS. 3A and 3B are schematic diagrams outlining the structures of a detector module and a light shielding member in a second embodiment.
Figure 3B:
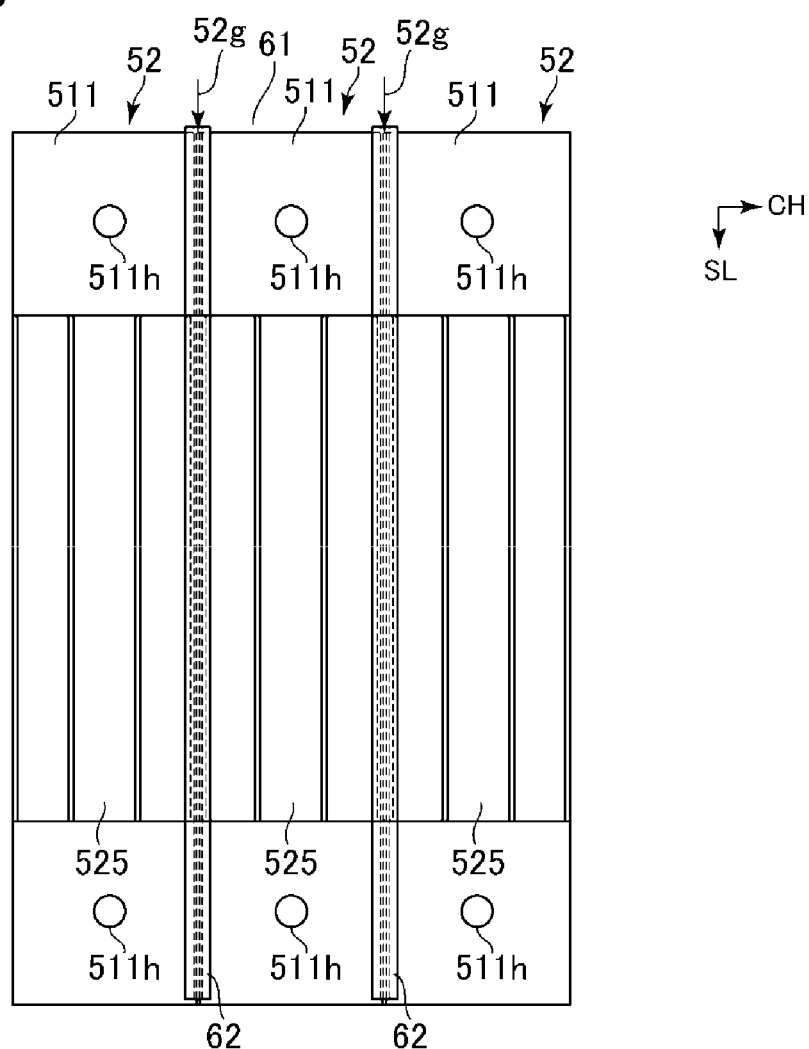

FIGS. 3A and 3B outline the structures of a detector module and a light shielding member in the second embodiment. FIG. 3A is a partially enlarged cross-sectional diagram of an X-ray detector 24' of the second embodiment as viewed in the slice (SL) direction. FIG. 2B is a partially enlarged cross-sectional diagram of the X-ray detector 24' as viewed in the iso-center (I) direction.

As shown in FIGS. 3A and 3B, the X-ray detector 24' includes a plurality of detector modules 52 and a plurality of light shielding members 62 as in the first embodiment.

As shown in FIGS. 3A and 3B for example, a radiator 525 possessed by the detector module 52 has one fin 525f mounted upright at the center of a plate-like base portion 525k. The fin 525f is oriented in the iso-center (I) direction and extends in the slice direction. On both outer walls of the fin 525f in the channel (CH) direction are protrusions 525ha and 525hb each extending from the center of the channel direction toward the outer side and approximately in parallel with the plate surface of the base portion 525. In this example, the protrusions 525ha and 525hb are each an L-shaped rectangular plate member of which one of the outer faces is fixed to the wall surface of the fin 525f.

The edges on both sides of the radiator 525 in the channel (CH) direction are chamfered at a predetermined angle. Thus where a plurality of detector modules 52 are arrayed, the gaps 52g between the modules 52 form just a Y-shape when viewed in the slice (SL) direction.

The base portion 525k and the protrusion 525ha on one edge make up a first support portion 52ra supporting the light shielding member 62. Likewise, the base portion 525k and the protrusion 525hb on the other edge form a second support portion 52rb supporting the light shielding member 62. The first and the second support portions 52ra and 52rb are configured so that when a plurality of detector modules 52 are arrayed, the first support portion 52ra of one of two adjacent detector modules 52 is paired with the second support portion 52rb of the other adjacent detector module 52 in a manner supporting the light shielding member 62 covering the gap 52g between these detector modules 52.

The first and the second support portions 52ra and 52rb are symmetrically shaped relative to the center line of the detector module 52 in the channel (CH) direction.

Also, the radiator 525 including the protrusions 525ha and 525hb is colored black or the like.

Meanwhile, the light shielding member 62 has a column-like shape extending in the slice (SL) direction. When viewed in the slice direction, the light shielding member 62 has a cross section shaped in such a manner that a triangle with its vertexes positioned in the iso-center (I) direction is joined with a rectangle longer in the channel (CH) direction in a manner sandwiching a rectangle in the iso-center (I) direction. This structure forms a concave portion on each of the two outer sides in the channel direction.

The first and the second support portions 52ra and 52rb of the radiator 525 are shaped and arranged so that the tips of the protrusions 525ha and 525hb are engaged with the above-mentioned two concave portions formed in the light shielding member 62 for support of the latter. Also, the tip of the light shielding member 62 in the iso-center (I) direction is shaped to be snugly engaged with the Y-shaped concave portion of the gap 52g.

In the above-described second embodiment, as in the first embodiment, the gaps 52g between the detector modules 52 are light shielded by attaching the light shielding member 62 to the support portions 52ra and 52rb possessed by the detector modules 52. This also makes it possible to light shield the gaps 52g between the detector modules 52 securely and easily while eliminating the need for tedious and unstable work that typically involves manually sealing these gaps with light shielding tapes or the like.

The embodiments above may be modified, supplemented, or otherwise altered within the spirit and scope of the appended claims.

Although the above embodiments were explained as X-ray CT equipment, they are not limited only for use as X-ray CT equipment. The systems and methods described herein may also be applied to PET-CT equipment combining the X-ray CT equipment with PET, SPECT-CT equipment combining the X-ray CT equipment with SPECT, and other general imaging apparatuses.

What is claimed is:

1. A detector module configured to be included in an array of a plurality of detector modules that form a radiation detector, said detector module comprising:
   a light emitting element configured to emit fluorescence upon receiving radiation;
   a light receiving element configured to convert the fluorescence into an electrical signal; and
   at least one support member located on a side opposite from said light emitting element, said at least one support member configured to support a light shielding member which covers a gap formed between adjacent detector modules in the array.

2. The detector module according to claim 1, wherein said at least one support member comprises a support member provided at each of two edges in an array direction in which the detector modules are arrayed, each support member configured to support said light shielding member with a support member of an adjacent detector module in the array.

3. The detector module according to claim 2, further comprising a radiator on the side opposite said light emitting element, wherein said at least one support member is provided on said radiator.

4. The detector module according to claim 2, wherein each support member is configured to support said light shielding member by receiving at least a portion of said light shielding member therein.

5. The detector module according to claim 4, wherein said support members are shaped symmetrically to each other relative to a center line of said detector module.

6. The detector module according to claim 4, further comprising a radiator on the side opposite said light emitting element, wherein said at least one support member is provided on said radiator.

7. The detector module according to claim 2, wherein said support members are shaped symmetrically to each other relative to a center line of said detector module.

8. The detector module according to claim 1, further comprising a radiator on the side opposite said light emitting element, wherein said at least one support member is provided on said radiator.

9. The detector module according to claim 8, wherein said at least one support member is formed integrally with said radiator.

10. The detector module according to claim 8, wherein said at least one support member is formed using a part fixed to said radiator.

11. The detector module according to claim 8, wherein said radiator is made of aluminum or an aluminum alloy.

12. A light shielding member configured to cover gaps formed between a plurality of detector modules arrayed to form a radiation detector, each of the plurality of detector modules including at least one support member for supporting said light shielding member, the at least one support member provided on a side opposite from a radiation incidence plane.

13. The light shielding member according to claim 12, wherein said light shielding member is configured to cover parallel gaps formed between at least three arrayed detector modules.

14. The light shielding member according to claim 13, wherein said light shielding member comprises a plurality of integrally joined light shielding plates, each of said light shielding plates corresponding to a gap.

15. The light shielding member according to claim 12, wherein a width of a portion of said light shielding member supported by the at least one support member is irregular along a lengthwise direction.

16. The light shielding member according to claim 12, wherein said light shielding member is black.

17. The light shielding member according to claim 12, wherein said light shielding member is composed of a plastic resin.

18. A radiation detecting apparatus comprising a plurality of detector modules arranged to form a radiation detector, each of said detector modules comprising:
   a light emitting element configured to emit fluorescence upon receiving radiation;
   a light receiving element configured to convert the fluorescence into an electrical signal; and
   at least one support member located on a side opposite from said light emitting element, said at least one support member configured to support a light shielding member which covers a gap formed between adjacent detector modules.

19. A radiation imaging apparatus comprising a radiation detecting apparatus, wherein said radiation detecting apparatus comprises a plurality of detector modules arranged to form a radiation detector, each of said detector modules comprising:
   a light emitting element configured to emit fluorescence upon receiving radiation;
   a light receiving element configured to convert the fluorescence into an electrical signal; and
   at least one support member located on a side opposite from said light emitting element, said at least one support member configured to support a light shielding member which covers a gap formed between adjacent detector modules.

20. A radiation imaging apparatus according to claim 19, wherein said radiation imaging apparatus is configured to perform radiation imaging of an object.

* * * * *